Patented Aug. 27, 1929.

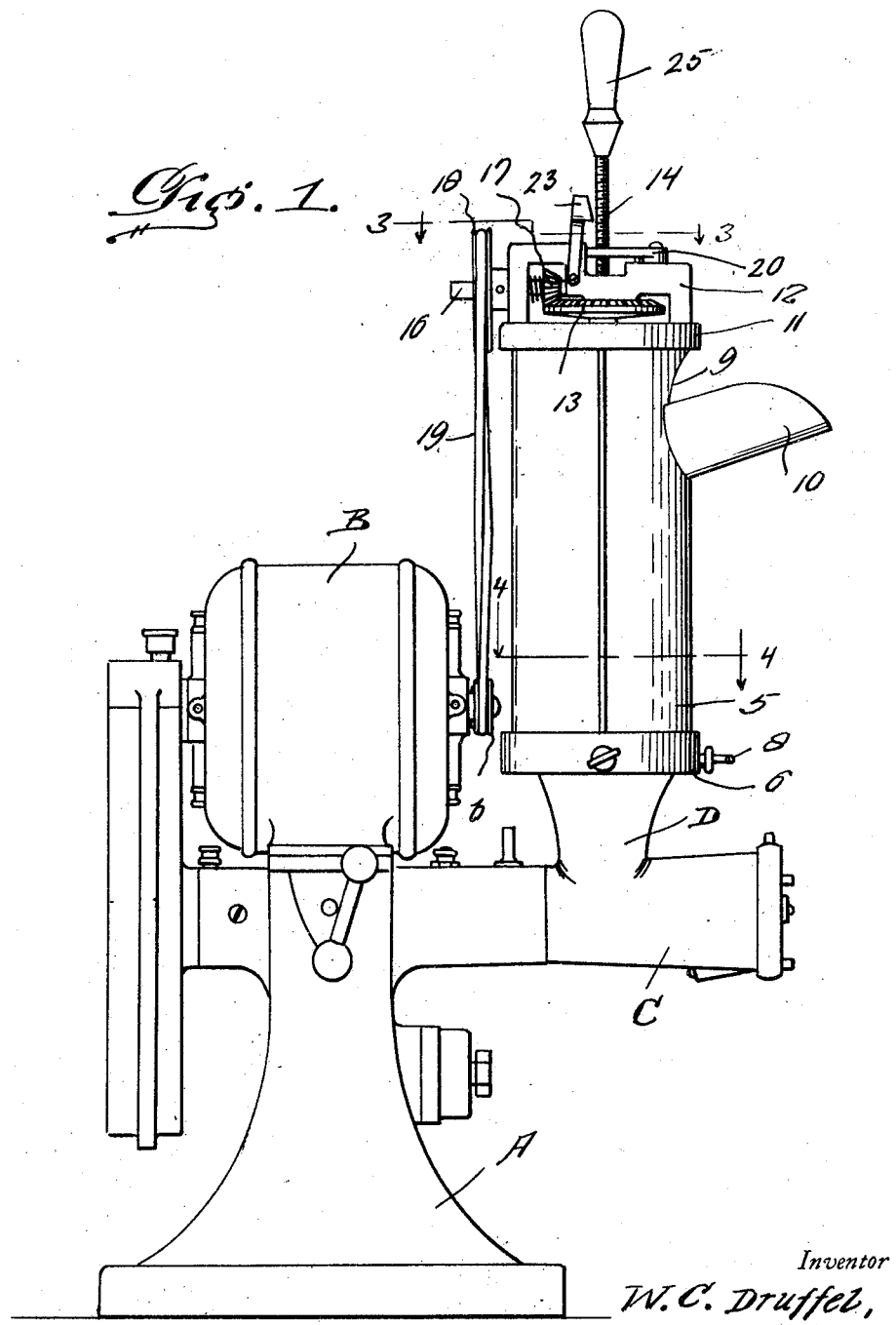

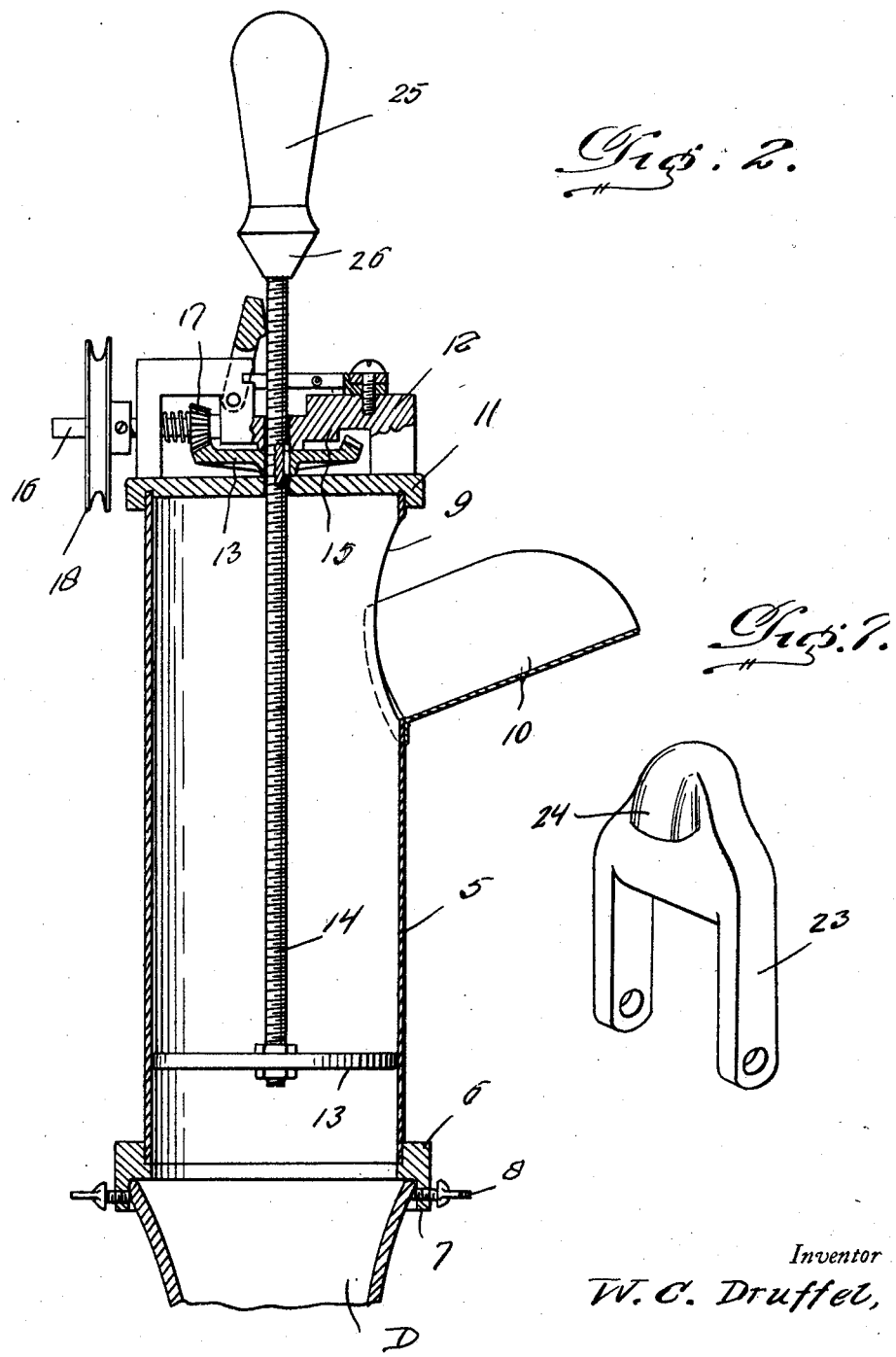

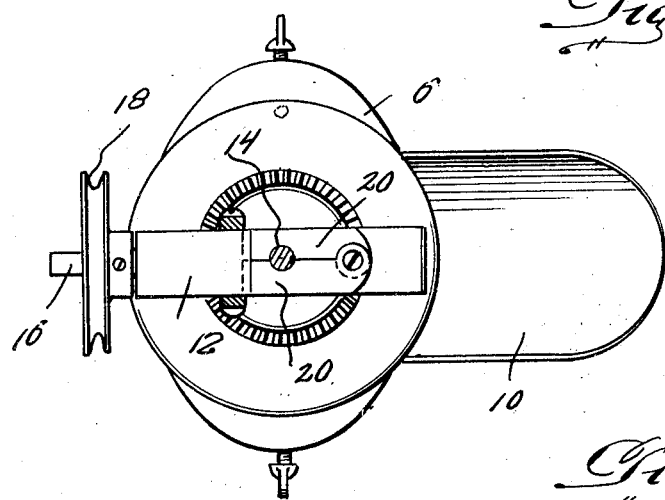
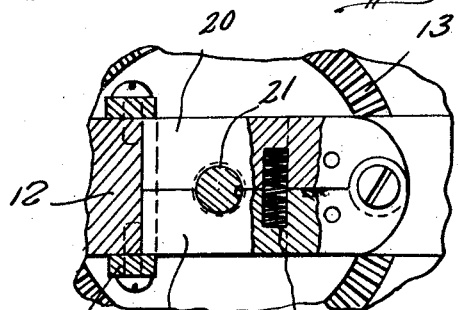
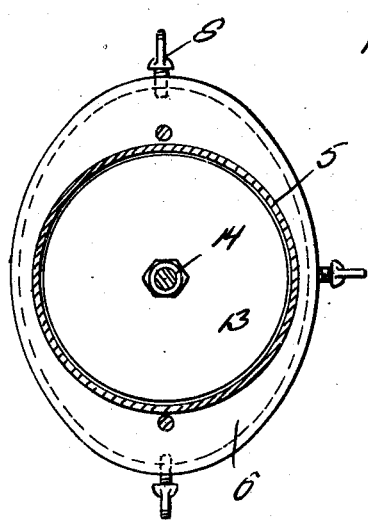
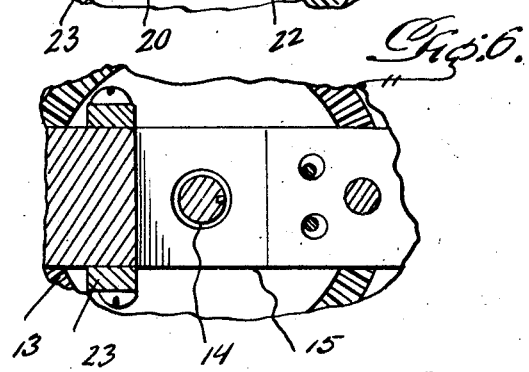

1,726,475

UNITED STATES PATENT OFFICE.

WILLIAM C. DRUFFEL, OF QUINCY, ILLINOIS.

MATERIAL-FEEDING DEVICE FOR GRINDING MACHINES.

Application filed April 6, 1928. Serial No. 267,986.

This invention relates to new and useful improvements in machines for grinding meat or the like, especially those of the motor driven variety and has more particular reference to a device whereby the material is automatically fed to the grinder so as not to require the services of an attendant during the grinding of a large amount of meat or other material. An important object of this invention resides in the provision of a feeding device of this character that is driven by the grinder motor and that is operable simultaneously with the operation of the grinder so as to continuously feed the meat or other material to the grinder during its operation.

Generally the invention consists of a container of suitable capacity adapted to be secured to the mouth of the grinding unit and within which container is rectilinearly movable a piston automatic means being provided for slowly moving the piston in a downward direction when the motor of the grinding machine is in operation so as to obviously press the material from the container into the mouth of the grinding unit.

A further and most important object resides in the provision of automatically operable means for releasing the piston from the driving structure when the same has reached a predetermined point toward the lower end of the container so that there will be no liability of the parts jamming. Furthermore this means is of such construction as to permit of the rapid raising of the piston by hand, after the container has been completely discharged so it may again be filled.

In the drawings wherein like reference characters indicate corresponding parts throughout the several views:

Figure 1 is a side elevation of the meat grinding unit of a generally conventional combination coffee and meat grinder of the motor driven type with which is associated my improved feeding mechanism.

Figure 2 is a detail longitudinal section through the invention per se.

Figure 3 is a horizontal section taken substantially upon the line 3—3 of Figure 1 and looking downwardly in the direction of the arrows.

Figure 4 is a detail horizontal section taken substantially upon the line 4—4 of the same figure and also looking downwardly.

Figure 5 is a fragmentary horizontal section taken at a point slightly beneath the section line of Figure 3 for disclosing the pair of complementary jaw members pivoted to the upper end of the machine which jaw members are formed at their inner edges with rounded and threaded notches for engaging the threaded stem of the piston so that when the jaws are locked, and the stem rotated, the same will result in the downward movement of the piston.

Figure 6 is similar sectional view taken slightly beneath the section line of Figure 5, and Figure 7 is a perspective of the jaw locking member.

Now having particular reference to the drawings, A designates generally the meat grinding section of a generally conventional combined meat and coffee grinder, the driving motor being designated by the reference character B, while the shell for the usual spiral grinding shaft of the grinder is designated by the reference character C, the material inlet mouth thereof being designated by the reference character D. In this instance the outer end of the armature shaft of the motor B is equipped with a small belt pulley $b$. The invention per se consists of a cylindrical container of predetermined capacity open at its opposite ends as disclosed in Figure 2. The lower end of the container is arranged within a ring 6 formed with a depending flange 7 for engagement around the grinder shaft casing mouth D and to be secured thereto by thumb screws 8 threaded through the flange of said ring. Adjacent its opposite end this container 5 is formed with a material inlet opening 9 from the lower edge of which projects a material receiving trough 10 to facilitate the disposition of the material within said container.

Arranged upon the upper end of this container is a suitable cap 11 formed or constructed at its top surface with a horizontal bracket arm 12 having spaced relation with the cap 11 intermediate its ends.

Rectilinearly movable within the container 5 is a disc-like piston 13 arranged upon the lower end of a threaded stem 14 that projects through and is movable within an opening in the center of the container lid 11. Splined on this threaded stem 14 directly above the lid 11 is a relatively large bevel gear 13. Said arm 12 directly above this bevel gear is formed with a downwardly offset portion 15 having an opening therein through which the threaded stem 14 is freely movable. Journaled through one of the down turned ends of the bracket arm 12 and within a socket formed in the adjacent end of the offset portion 15 of said arm is a shaft 16 equipped at its inner end with a small bevel gear 17 for mesh with the bevel gear 13, the outer end of said shaft being equipped with a relatively large belt pulley 18 whereby this shaft 16 will be driven by the motor B when an endless belt 19 is properly trained over the motor pulley b and said pulley 18, see Figure 1.

Obviously, the rotation of the shaft 16 will result in the turning of the piston stem 14 for a purpose presently to be described. Loosely pivotally secured at their outer ends to the top side of the bracket arm 12 remote from the shaft 16 is a pair of horizontally extending complemental plate-like jaws 20—20, the opposed edges of which are formed with complemental threaded semi-circular notches 21 for engagement around the threaded stem 14 when these jaws are closed, as clearly indicated in Figure 5. Arranged at its opposite ends within sockets formed in the adjacent edges of these plate-like jaws in back of the notches 21 is an expansible coil spring 22 for the purpose of normally separating the jaws so as to maintain the same out of engagement with the threaded stem 14. The outer ends of the jaws terminate adjacent that portion of the bracket arm 12 above the offset portion 15, while pivoted to the bracket arm adjacent the free ends of these jaws is an inverted U-shaped yoke 23 which when swung inwardly toward the piston stem 14 will cause the legs thereof to engage the outer edges of the jaws for maintaining the same in tight engagement with the said stem 14, so that the rotation of the stem 14 will result in the downward movement thereof, and consequently the downward movement of the piston 13 within the container 5 so as to forcibly move the material within the container into the material receiving mouth D of the grinding structure.

The surface of the locking yoke 23 adjacent the stem 14 is formed adjacent its upper end with a tapered boss 24, while arranged upon the upper end of the stem 14 is a handle 25 formed at its lower end with a tapered extension 26, this extension 26 obviously engaging the boss 24 of the locking yoke 23 when the piston 13 is at a point adjacent the lower end of the container 5 for obviously releasing the yoke whereupon the jaws will separate from the stem 14 permitting the device to operate without causing a further downward movement of the piston or a binding of the parts.

It will thus be seen that I have provided a highly novel, useful, efficiently operating and relatively inexpensive feeding device for meat grinders and one that may be applied to not only the type of grinder disclosed in the drawings, but any other motor driven grinder and that will be well adapted to all the purposes heretofore designated.

Having thus described the invention, what I claim as new and desire to secure by Letters Patent is:—

1. In a material feeding device of the class described, a material receiving container open at its respective ends and provided with an inlet opening adjacent its upper end, a closure arranged upon the upper open end of the container, a threaded stem movable through and rotatable within an opening in said closure, a plunger arranged within the container and secured on the lower end of the threaded stem, a gear splined on the threaded stem and arranged above said closure, a bracket secured on the top of the closure, the top portion of the bracket being spaced from the top of the closure, a drive shaft journaled for rotation through the side of the bracket, a gear on the inner end of the drive shaft for cooperation with the aforementioned gear to rotate the latter, a pair of horizontally extending complementary jaws pivotally secured at their outer ends on the top of the bracket, the inner opposed edges of said jaws being formed with complemental threaded notches for cooperation with the threaded stem, an expansible coil spring interposed between the jaws for normally urging the same apart, and dispose the threaded notches out of engagement with the threaded stem, and additional means arranged on the bracket for securing the jaws together to maintain the threaded notches in engagement with the stem and cause the rotation of said stem to move the plunger downwardly in said container.

2. In a material feeding device of the class described, a material receiving container open at its respective ends and provided with an inlet opening adjacent its upper end, a closure arranged upon the upper open end of the container, a threaded stem movable through and rotatable within an opening in said closure, a plunger arranged within the container and secured on the lower end of the threaded stem, a gear splined on the threaded stem and arranged above said closure, a bracket secured on the top of the closure, the top portion of the bracket being spaced from the top of the closure, a drive shaft journaled for rotation through the side of the bracket, a gear on the inner end of the drive shaft for cooperation with the aforementioned gear to rotate the latter, a pair of horizontally extending complementary jaws pivotally secured at their outer ends on the top of the bracket, the inner opposed edges of said jaws being formed with complemental threaded notches for cooperation with the threaded stem, an expansible coil spring interposed between the jaws for normally urging the same apart, and dispose the threaded notches out of engagement with the threaded stem, and additional means arranged on the bracket for securing the jaws together to maintain the threaded notches in engagement with the stem and cause the rotation of said stem to move the plunger downwardly in said container, said means comprising a yoke pivotally secured at its free end on the opposite sides of the bracket adjacent the free ends of the jaws, the arms of said yoke adapted to engage with the outer edges of the jaws and clamp the jaws in a closed position.

3. In a material feeding device of the class described, a material receiving container open at its respective ends and provided with an inlet opening adjacent its upper end, a closure arranged upon the upper open end of the container, a threaded stem movable through and rotatable within an opening in said closure, a plunger arranged within the container and secured on the lower end of the threaded stem, a gear splined on the threaded stem and arranged above said closure, a bracket secured on the top of the closure, the top portion of the bracket being spaced from the top of the closure, a drive shaft journaled for rotation through the side of the bracket, a gear on the inner end of the drive shaft for cooperation with the aforementioned gear to rotate the latter, a pair of horizontally extending complementary jaws pivotally secured at their outer ends on the top of the bracket, the inner opposed edges of said jaws being formed with complemental threaded notches for cooperation with the threaded stem, an expansible coil spring interposed between the jaws for normally urging the same apart, and dispose the threaded notches out of engagement with the threaded stem, and additional means arranged on the bracket for securing the jaws together to maintain the threaded notches in engagement with the stem and cause the rotation of said stem to move the plunger downwardly in said container, said means comprising a yoke pivotally secured at its free end on the opposite sides of the bracket adjacent the free ends of the jaws, the arms of said yoke adapted to engage with the outer edges of the jaws and clamp the jaws in a closed position, and cooperating means between the upper end of the threaded stem and the crown portion of the yoke for automatically releasing the yoke from engagement with the complementary jaws when the stem has travelled downwardly a predetermined distance as and for the purpose described.

4. In a material feeding device of the class described, a material receiving container open at its respective ends and provided with an inlet opening adjacent its upper end, a closure arranged upon the upper open end of the container, a threaded stem movable through and rotatable within an opening in said closure, a plunger arranged within the container and secured on the lower end of the threaded stem, a gear splined on the threaded stem and arranged above said closure, a bracket secured on the top of the closure, the top portion of the bracket being spaced from the top of the closure, a drive shaft journaled for rotation through the side of the bracket, a gear on the inner end of the drive shaft for cooperation with the aforementioned gear to rotate the latter, a pair of horizontally extending complementary jaws pivotally secured at their outer ends on the top of the bracket, the inner opposed edges of said jaws being formed with complemental threaded notches for cooperation with the threaded stem, an expansible coil spring interposed between the jaws for normally urging the same apart, and dispose the threaded notches out of engagement with the threaded stem, and additional means arranged on the bracket for securing the jaws together to maintain the threaded notches in engagement with the stem and cause the rotation of said stem to move the plunger downwardly in said container, said means comprising a yoke pivotally secured at its free end on the opposite sides of the bracket adjacent the free ends of the jaws, the arms of said yoke adapted to engage with the outer edges of the jaws and clamp the jaws in a closed position, and cooperating means between the upper end of the threaded stem and the crown portion of the yoke for automatically releasing the yoke from engagement with the complementary jaws when the stem has travelled downwardly a predetermined distance as and for the purpose described, said last mentioned means comprising a handle secured on the upper end of the stem and formed with a tapered lower end portion, the crown of said yoke being formed with a tapered boss with which the tapered portion of the handle is adapted to engage and swing the pivoted yoke to an inoperative position.

In testimony whereof I have affixed my signature.

WILLIAM C. DRUFFEL.